US00RE50171E

(19) United States
(12) Reissued Patent
Kieser

(10) Patent Number: US RE50,171 E
(45) Date of Reissued Patent: Oct. 15, 2024

(54) AUTOMATED ANALYSIS OF COMPLEX MATRICES USING MASS SPECTROMETER

(71) Applicant: DH TECHNOLOGIES DEVELOPMENT PTE. LTD., Singapore (SG)

(72) Inventor: Byron Kieser, Head of Jeddore (CA)

(73) Assignee: DH TECHNOLOGIES DEVELOPMENT PTE. LTD., Singapore (SG)

(21) Appl. No.: 17/682,960

(22) Filed: Feb. 28, 2022

Related U.S. Patent Documents

Reissue of:
(64) Patent No.: 7,548,818
Issued: Jun. 16, 2009
Appl. No.: 11/567,281
Filed: Dec. 6, 2006

U.S. Applications:
(60) Provisional application No. 60/803,355, filed on May 27, 2006, provisional application No. 60/742,910, filed on Dec. 7, 2005.

(51) Int. Cl.
*B01D 59/44* (2006.01)

(52) U.S. Cl.
CPC ..... *B01D 59/44* (2013.01)

(58) Field of Classification Search
CPC ..... B01D 59/44
USPC ..... 702/22, 24, 30; 436/43, 47, 173
See application file for complete search history.

(56) References Cited

U.S. PATENT DOCUMENTS 5,025,391 A 6/1991 Filby et al.
6,285,027 B1 9/2001 Chernushevich et al.
6,730,517 B1 5/2004 Koster et al.
6,884,997 B2 * 4/2005 Kashima et al. ..... 250/288
(Continued)

FOREIGN PATENT DOCUMENTS

JP H0582080 A 4/1993
JP H0905300 A 1/1997
WO WO-2004090933 A2 * 10/2004 ..... G01N 30/8689

OTHER PUBLICATIONS

Hopfgartner, G. et al., "Triple quadrupole linear ion trap mass spectrometer for the analysis of small molecules and macromolecules," Journal of Mass Spectrometry, vol. 39, No. 8, Aug. 2004, pp. 845-855.

(Continued)

*Primary Examiner* — My Trang Ton
(74) *Attorney, Agent, or Firm* — Potomac Law Group, PLLC; Reza Mollaaghababa; Ido Rabinovitch

(57) ABSTRACT

Improved systems, apparatus, methods, and programming useful for the automated analysis of complex compounds using mass spectrometers. Systems, apparatus, methods, and programming according to the invention provide for the automatic determination by a controller 54 of a mass spectrometer 14, 214 of an analysis operation to be implemented using the mass spectrometer, the analysis operation adapted specifically for analysis of one or more substances based contained within a compound based on identification of the compound and/or substances provided by a user of the spectrometer, and a database 66 or other library of information concerning suitable processes or process steps for analyzing substances.

89 Claims, 4 Drawing Sheets

(56) References Cited

U.S. PATENT DOCUMENTS 6,909,981 B2 6/2005 Gavin et al.

OTHER PUBLICATIONS

Watson, J. T. et al., "Introduction to Mass Spectrometry—Instrumentation, Applications and Strategies for Data Interpretation," John Wiley & Sons, pp. 53-172 (Chapter 2: The Mass Spectrometer), 2007 (122 pages).
"Information Dependent Acquisition—The Next Generation of Data Dependent Experiments of LC/MS/MS Analysis," Product Bulletin, Applied Biosystems, 2001 (4 pages).
"Analyst 1.6 Software—Information Dependent Acquisition Tutorial," Ab Sciex, Aug. 2011 (24 pages).
"Analyst 1.4 Software—Owner's Manual," MDS Sciex/Applera Corp. (Chapter 7, Building an Acquisition Method, pp. 133-160), Jun. 2003 (326 pages).
International Search Report mailed Mar. 21, 2007 in PCT App. No. PCT/CA2006/001999 (2 pages).
Written Opinion of the International Searching Authority mailed Mar. 21, 2007 in PCT App. No. PCT/CA2006/001999 (6 pages).
International Preliminary Report on Patentability mailed Jun. 11, 2008 in PCT App. No. PCT/CA2006/001999 (7 pages).

* cited by examiner

AUTOMATED ANALYSIS OF COMPLEX MATRICES USING MASS SPECTROMETER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS AND PRIORITY CLAIM

This application *is an application for reissue of U.S. Pat. No. 7,548,818 issued 9 Jun. 2009 and entitled "Automated Analysis of Complex Matrices Using Mass Spectrometer," which corresponds to U.S. patent application Ser. No. 11/567,281 filed 6 Dec. 2006, which* claims the priority of U.S. Provisional patent application 60/742,910 filed 7 Dec. 2005 and entitled "Automated Analysis of Complex Matrices Using Mass Spectrometer," [the entire contents of which are incorporated herein by this reference,] and U.S. Provisional patent application 60/803,355 filed 27 May 2006 and entitled "AUTOMATED ANALYSIS OF COMPLEX MATRICES USING MASS SPECTROMETERY," *which applications are incorporated by reference in their entireties.*

INTRODUCTION

The invention relates to mass analyzers.

It is sometimes desired to analyze simultaneously a large number of analytes contained in a complex matrix of substances. This can be useful, for example, in forensic, environmental, metabolic, and food, drug, and beverage studies.

One method of conducting such analyses has included the use of chromatographic devices such as liquid chromatographic (LC) columns used in combination with mass spectrometers, as for example in combination liquid-chromatography—recursive mass spectroscopy (LC-MS/MS) mass analyzers. Typically in such analyses a chromatographic device causes the analyte matrix to be released or otherwise provided to the mass spectrometer in a distributed manner, such that various analytes are provided to the mass spectrometer over various periods of time. Multiple reaction monitoring (MRM) and/or other recursive or distributed-analysis techniques can be employed to analyze the analytes as they are received by the mass spectrometer.

MRM techniques involve multiple scannings by the mass spectrometer. Typically the multiple scannings are adapted, as for example by configuring the mass spectrometer to provide suitable electromagnetic fields, for the detection of ions of varying mass-charge (m/z) ratios as they are released by the chromatographic device over time. Because of the varying m/z ratios to be analyzed, it is desirable for the mass spectrometer to be configured so as to provide suitable conditions for the release and detection of the corresponding ions during the time periods at which they are released by the chromatographic device.

Using prior art systems, it has been necessary, in order to obtain the most efficient possible MRM analyses, for a user of the mass analyzer to provide to the mass spectrometer a long and difficult series of commands in an attempt to manually (i.e., non-automatically) configure the mass spectrometer for optimal analysis of the various analytes present in the matrix. Such input requirements are error-prone, undesirably time-consuming, and tend to result in inefficient use of mass analyzers.

SUMMARY

The invention provides improved systems, apparatus, methods, and programming useful for the automated analysis of compounds, and particularly of complex substance matrices, using mass spectrometers. Systems, apparatus, methods, and programming according to the invention provide for the automatic determination by a controller of a mass spectrometer of an analysis operation to be implemented using the mass spectrometer, the analysis operation adapted specifically for analysis of one or more substances based contained within a compound based on identification of the compound and/or substances provided by a user of the spectrometer, and a database or other library of information concerning suitable processes or process steps for analyzing substances.

For example, in one embodiment a user is enabled to provide an identifier, such as a name or other unique means of specification, to the controller, for use by the controller in accessing a data base or other information library and automatically determining an optimal duty cycle for each of a plurality of analytes contained in a compound comprising a plurality of substances, and determining command signals suitable for configuring the mass analyzer to implement such duty cycles. The duty cycles may be implemented, for example, on a recursive mass analyzer such as a Multiple Reaction Monitoring (MRM) or Enhanced Product Ion (EPI) mass spectrometer.

Additional aspects of the present invention will be apparent in view of the description which follows.

BRIEF DESCRIPTION OF THE FIGURES

The invention is illustrated in the figures of the accompanying drawings, which are meant to be exemplary and not limiting, and in which like references are intended to refer to like or corresponding parts. Those skilled in the relevant art(s) will understand that the drawings are for illustrative purposes only, and are not intended to limit the scope of the teachings herein in any way.

DETAILED DESCRIPTION OF VARIOUS EMBODIMENTS

Figure 1:
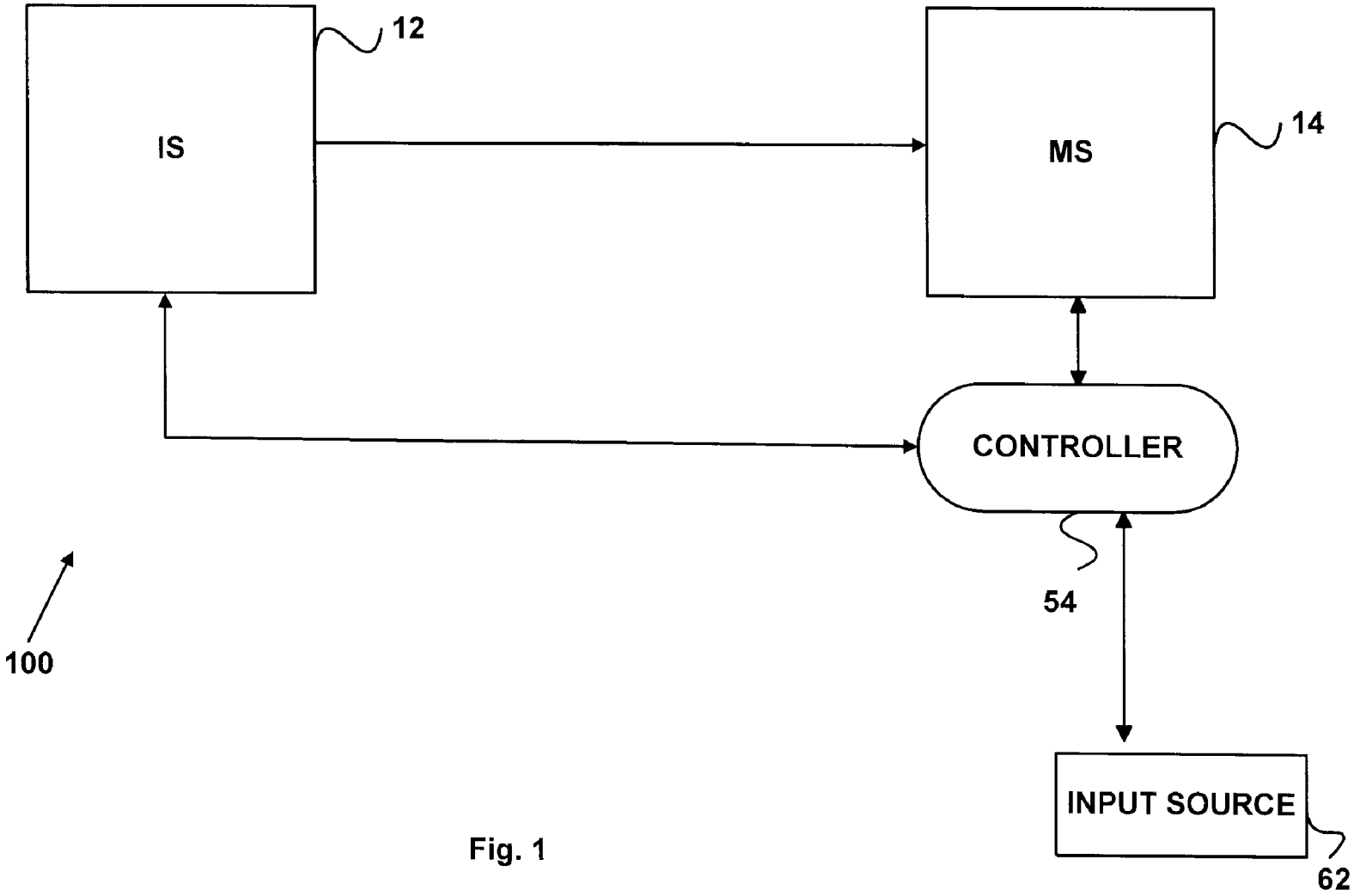
FIGS. 1 and 2 are schematic diagrams of mass analyzers suitable for use in implementing the invention.
Figure 2:
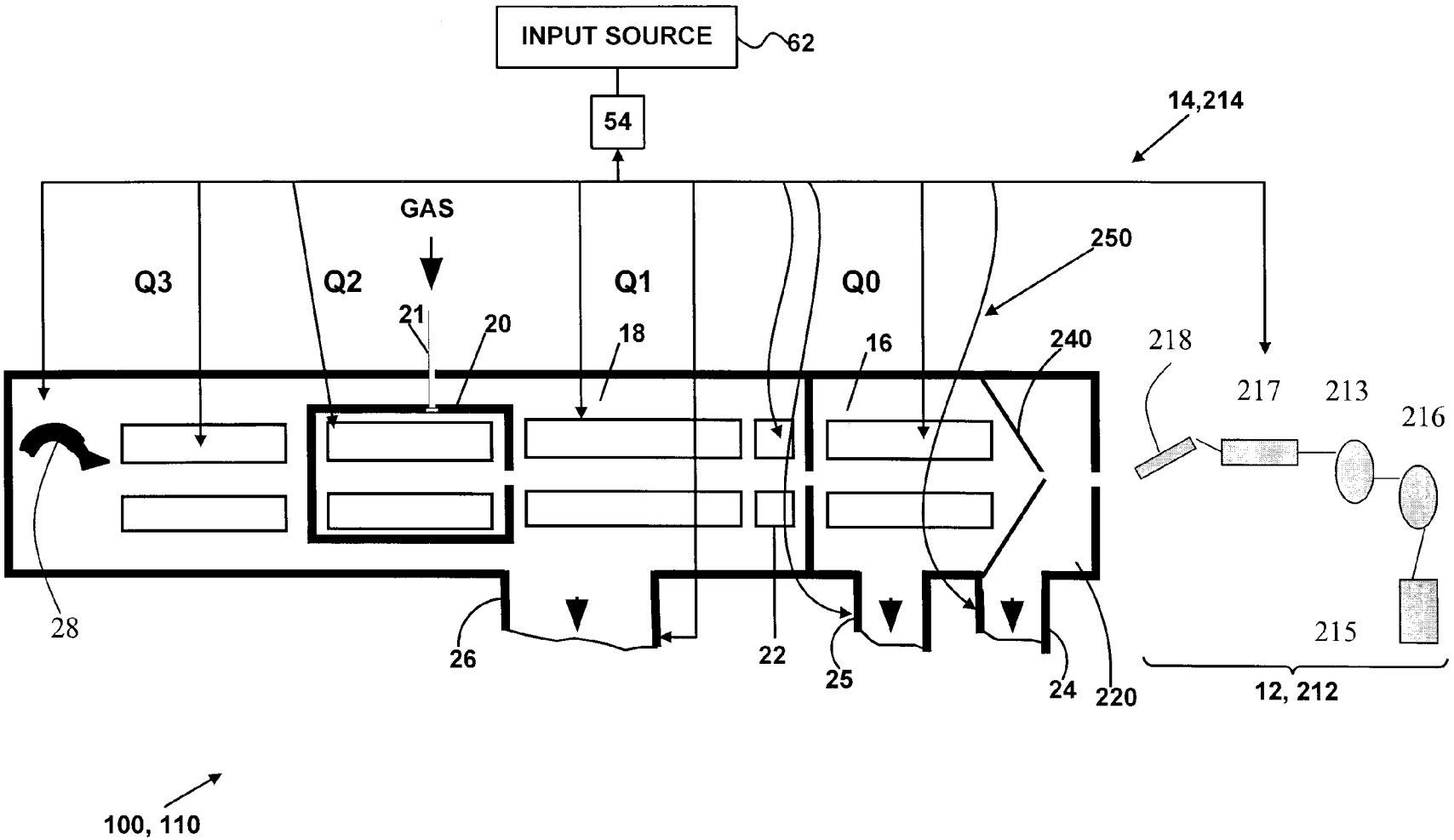

FIGS. 1 and 2 are schematic diagrams of mass analyzers suitable for use in implementing the invention. Mass analyzer(s) 100 comprise ion or compound source(s) (hereinafter "ion source(s)" or "IS(s)") 12, mass spectrometer(s) ("MS(s)") 14, and controller(s) 54. The example shown in FIG. 1 is more general than that shown in FIG. 2, and illustrates the concept that any combination of an ion source(s), mass spectrometer(s), and controller of any type(s) adaptable for the purposes disclosed herein may be used in implementing the invention; and illustrates general conceptual relationships of the components of mass analyzer 100 to each other. For example, ion source 12 provides analyte ions to mass spectrometer 14 for analysis, while controller 54 controls the operation of mass spectrometer 14 and optionally ion source 12. For brevity, the term ion source can apply generally to each and/or all of the various components of the sample introduction system, including, for example, those used in liquid sample handling, liquid chromatography and the ionizing systems described below. In various embodiments, the ionization (ionizer) part of the ion source 12, in which ions are generated, can be a separate component associated with the mass spectrometer 14 or there can be a mass spectrometer interface where the ions are generated by ionization methods generally known in the art.

In the more specific embodiment shown in FIG. 2, mass analyzer 100 comprises a liquid chromatography—recursive mass spectrometry (LC-MS/MS) mass analyzer 110. LC-MS/MS mass analyzer 110 comprises an ion source 12 in the form of liquid chromatograph 212 and ionizer 218 (ionspray as shown) for generating ions, and mass spectrometer 14 comprising triple quadrupole mass spectrometer 214. Examples of such systems include the API 3000™ and API 4000™ LC-MS/MS system marketed by MDS Sciex; however, those skilled in the relevant arts will appreciate that the invention can be applied to any suitably-controlled system comprising MS, MS/MS or other multi-MS capabilities (e.g., 3D traps or time-of-flight (TOF) analyzers).

As will be understood by those skilled in the relevant arts, liquid chromatography is an analytical chromatographic technique used to separate ions dissolved in solvent(s), and is one way in which, for example, multiple substances within a given compound can be introduced to the MS interface to be ionized, and thus ions of varying m/z ratios provided to a mass spectrometer over a period of time, in a distributed manner. When for example a sample solution comprising the targeted analytes is introduced via sample injector 213 to solvent 215 provided by pump 216 and placed in contact with suitable second solid or liquid phase reaction agent(s) in column 217, reactions may be caused which have the effect of separating analytes of interest from other substances. By making use of different transit times required for the reaction products, including the target analytes, to pass through the column 217, analytes of interest, which typically comprise ions of varying m/z ratios, may be introduced to a mass spectrometer 14, 214 in a distributed manner over a range of times.

As will be further understood by those skilled in the relevant arts, a wide variety of ion sources including the ionizers 218, such as an ionspray, and LC columns are suitable for use in implementing the invention described herein. Preferred ion sources are those which separate analytes within the test matrix in such a way that the analytes or analyte ions are provided to the mass spectrometer 14 in a distributed manner, i.e., over a range of times, so as to facilitate recursive mass analyses by mass spectrometer 14 using MRM or other suitable techniques. LC columns represent only one type of source for introducing analyte solution to be ionized that is currently available and suitable for use in implementing the invention. Others are now commercially available, and will doubtless hereafter be developed. Analytes may be introduced to the mass spectrometer 14 by means other than LC; for example, analytes may be separated based on a variety of selective extraction or derivatization techniques, and presented in solution form to the mass spectrometer 14 without the benefit of further LC separation. Another example exists commercially as analytes are crystallized with or without a matrix and introduced to the mass spectrometer 14 for ionization as is the case with matrix-assisted-laser-desorption-ionization (MALDI), or other surface ionization applications.

Mass spectrometer 14 in FIG. 2 comprises a triple quad mass spectrometer device 214 which includes tandem quadrupole ion guide 250. Ions provided by ion source 12, 212 pass into mass spectrometer 14, 214 through deferentially-pumped region 220, and from there through skimmer 240 into a first collimating quadrupole Q0. In order to further accommodate desired manipulation of ions provided by ion source 12, 212, collimating quadrupole Q0 can for example be located in a chamber 16 maintained at a pressure around 10.sup.−2 torr.

Upstream from rod set Q1 within chamber 18, in the embodiment shown, is a short collimating rod set 22. Collimating rod set 22 can for example be used to focus ions of selected m/z ratios prior to their being introduced to rod set Q1.

Mass spectrometer 214 can further comprise downstream chamber 18, comprising triple rod sets Q1, Q2 and Q3, with Q2 being indicated within an interior subsidiary chamber 20. Chamber 18 can be maintained at a pressure of approximately 10.sup.−5 torr, while the subsidiary chamber 20 is supplied with nitrogen or argon gas as indicated at 21 for effecting collision-induced dissociation (CID). In currently-commercialized embodiments, chamber 20 is typically maintained at a pressure of around 10.sup.−2 torr.

The various chambers 16, 18, 20 can be connected in known manner to suitable pumps, as indicated at 21, 24, 25 and 26. Commonly, for example, differentially-pumped region 12 can be connected to a roughing pump, which can serve to back up higher performance pumps connected to the pump connections 25 and 26.

Rod sets Q1 and Q3 can be operated in various modes, including a mass-resolving mode, to select ions of particular m/z ratios. Selected ions pass through into Q2 and may be subjected to CID and/or other desired reaction. The resulting product ions and any remaining precursor ions may then be passed through into mass-resolving rod set Q3 and recorded by detector 28.

Thus, as will be understood by those skilled in the relevant arts, ions provided by ion source 12, 212 can be controlled by the various components of tandem quadrupole ion guide 250 in order to provide the ions to mass resolver Q3 in desired sequences. As described herein, for example, ions of various m/z ratios can be provided to Q3 at desired times and in desired sequences by suitably controlling gas pressures in the various chambers or devices 16, 18, 20, 220, 240, and/or by suitably controlling voltages applied across the electrodes of rod sets Q0, Q1, Q2, Q3 and 22. As further described herein, control signals suitable for controlling such gas pressures and voltages can be provided by controller 54.

As will be understood by those skilled in the relevant arts, mass spectrometers of any configurations or capabilities compatible with the purposes described herein are suitable for use in implementing the invention. Thus quadrupole linear ion trap (QTrap), tandem quadrupole time-of-flight (QqTOF), and other varieties of known mass spectrometers, and many types of mass spectrometers which may be developed in the future, are suitable for use in implementing the invention. Of particular advantage in some instances, as will occur to those skilled in the relevant arts once they have been made familiar with this disclosure, are mass spectrometers compatible with Multiple Reaction Monitoring (MRM) and Enhanced Product Ion (EPI) analysis.

Mass analyzer 100, 110 further comprises controller 54, which is adapted for receiving, storing, and otherwise processing data signals acquired from or otherwise provided by user-controlled input device(s) and/or by mass analyzer 100, 110; and for executing suitable algorithms to determine, and for providing command signals adapted for the control of operations performed by mass analyzer 100, 110 in accordance with such signals. For example, controller 54 is adapted for interpreting and providing signals useful for controlling voltages and pressures applied by and maintained within mass spectrometer 14, 214, and optionally for controlling ion source 12, 212. Controller 54 further provides a user interface suitable for controlling the mass analyzer 100, 110, and its components, and thus can include input/output devices suitable for accepting from the user and implementing commands suitable for analyzing substances.

In particular, controller 54 is adapted for receiving, from an input source 62, signals representing identifier(s) identifying one or more substances, using the identifier(s) to automatically access a data set comprising analysis parameters associated with the identifier, and, using the accessed data, automatically determining and providing to the mass spectrometer 14, 214 a set of command signals for use by a mass spectrometer in analyzing the substance(s). Controller 54 may further be adapted for processing data acquired by mass spectrometer 14, 214 in response to the provided command signals, and for using such acquired data in determining command signals for use by the mass spectrometer in further analyzing the substance(s). For example, controller 54 can be adapted to store data acquired from mass spectrometer 14, 214 representing substances identified by mass analyzer 100, and/or to process such data for output to a user in human-interpretable form such as a printed or displayed graph or plot.

As will be understood by those skilled in the relevant arts, controller 54 can comprise any data-acquisition and processing system(s) or device(s) suitable for use in accomplishing the purposes described herein. Controller 54 can comprise, for example, a suitably-programmed or -programmable general- or special-purpose computer or computer chip, or other automatic data processing equipment, with associated programming and data acquisition, input, output, communications, and control devices. In particular, controller 54 preferably comprises or is linked to or otherwise associated with suitable volatile and/or persistent memory(s).

Accordingly, controller 54 can comprise one or more automatic data processing chips adapted for automatic and/or interactive control by appropriately-coded structured programming, including one or more application and operating system programs, and any necessary or desirable volatile or persistent storage media. As will be understood by those of ordinary skill in the relevant arts, a wide variety of processors, programming languages, data acquisition, and control devices suitable for implementing the invention are now available commercially, and will doubtless hereafter be developed.

Examples of suitable controllers, comprising suitable processors, memories, input and output devices, and programming are those incorporated in the API 3000™ or API 4000™ LC-MS/MS systems available through MDS Sciex of Ontario, Canada.

As will be understood by those skilled in the relevant arts, an automated mass analyzer is any mass analysis device adapted to perform one or more operations useful in or required for mass analysis of target substances without a requirement for specific user command inputs. Combinations of controllers 54 adapted for such purposes with mass analyzers 100, 110 are examples of automated mass analyzers.

Figure 3:
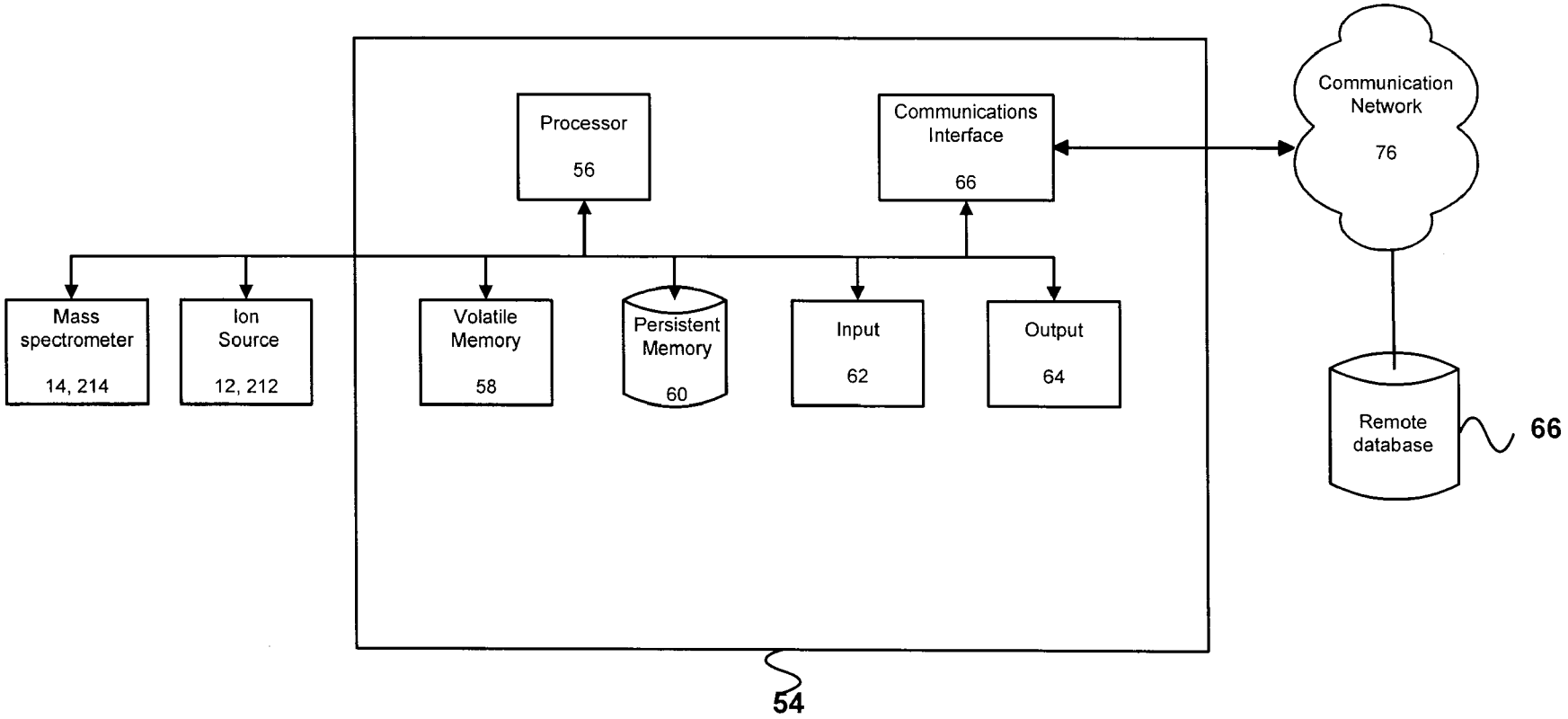
FIG. 3 is a schematic diagram of a controller suitable for use in implementing the invention.

An example of a controller architecture suitable for use in implementing the invention is shown in FIG. 3. In the embodiment shown in FIG. 3, controller 54 comprises one or more processors 56 and associated volatile memory 58, persistent memory 60, input device(s) 62, and output device(s) 64. Controller 54 is communicatively linked to mass spectrometer 12, 214 and to ion source 12, 212 (including various individual components thereof), in order to obtain data signals there from and to provide command signals thereto, as described herein. Controller 54 may further be communicatively linked to one or more remote data bases 66 via a communications network 76 such as a wired or wireless public or private network, such as the Internet or a local or wide-area network.

As will be understood by those skilled in the relevant arts, memories 58, 60, input and output devices 62, 62, and communications interface 66 can comprise any suitable devices or components, including for example optical and magnetic ROMs and RAMs, keyboards, pointing devices, display screens, printers, wireless devices, and modems. A wide variety of suitable devices and components are now commercially available, and will doubtless hereafter be developed.

Figure 4:
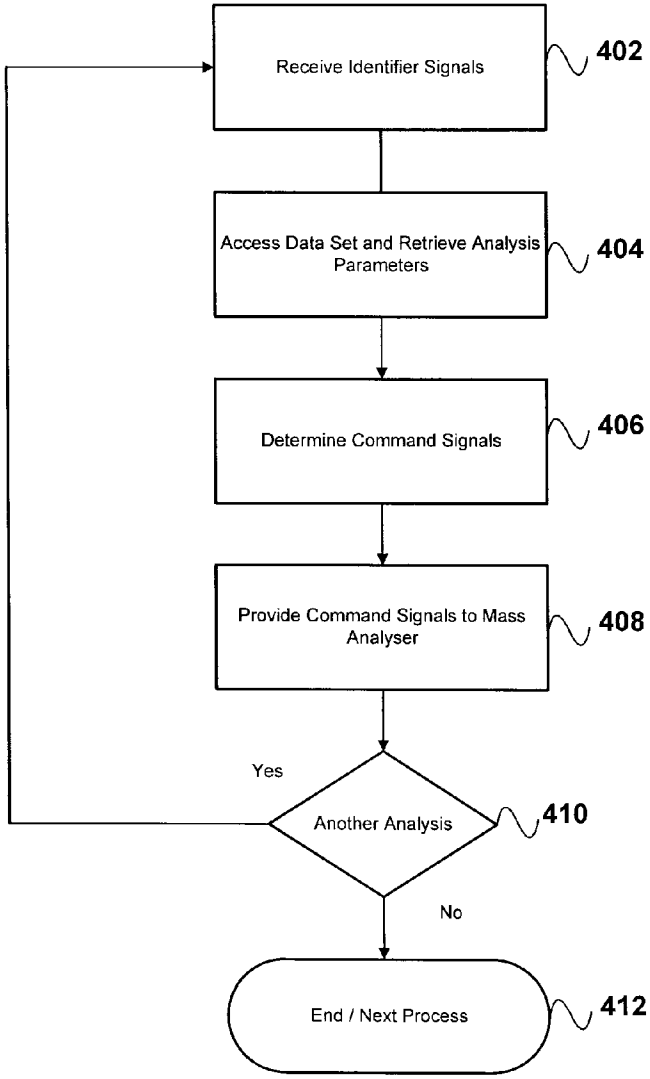
FIG. 4 is a schematic diagram of a process suitable for use in implementing the invention.

FIG. 4 is a schematic diagram of a process suitable for use in implementing the invention. Process 400 illustrated in FIG. 4 is suitable for implementation using, for example, mass analysers 100, 110 such as those shown in FIGS. 1 and 2, under the control of controllers as shown in FIG. 3, executing programs implementing suitably-programmed algorithms; and is described below as if so implemented. It is to be understood, however, that, as described herein, process illustrated 400 in FIG. 4 can be implemented using a wide variety of system and component configurations, including a wide variety of programming techniques.

At 402 controller 54 acquires or otherwise receives from an input source signals representing identifier(s) identifying one or more compounds or substances to be analysed. For example, a user of a mass analyzer 100, 110 uses a suitably-programmed and/or controlled input device 62 such as a keyboard, pointing device, and/or interactive screen display to enter data representing an accepted compound or substance name, or abbreviation thereof, or other unique identifier. The input device provides signals representing the entered data to the processor(s) 56. For example, the user can enter data identifying one or more chemicals, biological products such as a clinical test or forensic samples, or nutritional substances such as a foods or beverages by name, or by other coded reference such as index or reference number(s).

At 402 the user may also enter additional data identifying or otherwise specifying information relating to the manner in which the identified substance(s) are to be made available to the mass spectrometer 14 for analysis. For example, where a mass analyzer 100 comprises an LC column 212, and it is expected that an identified substance or compound will pass or begin to pass from the LC column to the mass spectrometer 14 at a given time, or within a given time range, the user can input data representing such time and/or time range, or coded reference to such information. As explained herein, such additional data can be used, for example, to further improve the efficiency of the analysis of the identified substance(s). Signals representing any such data input by the user may be provided to processor(s) 56 for use in controlling analysis of the identified substance(s) by the mass analyser 100. In applications which require the detection of hundreds or even thousands of substances in a sample, the efficiency of the mass analyser 100 may be improved by monitoring only for those compounds which are expected to pass from the LC column at specific times during the analysis. For example, in the analysis of apple products for pesticide residues, there may be 400 compounds to be monitored. Each compound has a specific elution time from the LC column. By employing the techniques described herein, the user may simply provide information about the compounds to be analysed such as their mass, desired parent-daughter ion transitions to be monitored, and elution time or time window, and the system can automatically control the analyser scan functions during the analysis such that only the compounds expected at each time point during the analysis would be scanned for; thus at any given time during the analysis much fewer than the total 400 compounds are being scanned for. Because the system can interpret the information provided by the user on a scan-by-scan basis, there is no need to construct a complicated acquisition method to the mass analyser 100 in advance of the analysis.

At 404 controller 54, using the identifier(s) received at 402, automatically accesses data comprising analysis parameters associated with the identifier(s). For example, processor(s) 56 can, by causing the transmission of suitable command signals, without further input from the user beyond the identifiers received at 402, query one or more of memories/databases or other data stores 58, 60, 66 to retrieve data associated with a compound associated with identifiers received at a process step 402, the compound comprising a plurality of substances and times or ranges of times over which those substances can be expected to be released or otherwise made available to a mass spectrometer 14 by an ionizer 218 as provided by the output from an LC column 214. In various embodiments, the ionizer 218 can generate ions directly from the output of the LC column in real time or the output substance from the LC column can be deposited onto a MALDI plate surface for future ionization as known in the art. For example, complex compounds comprising multiple known substances suspended or dissolved in known solvents have been analyzed using LC columns comprising known reaction agents, and the output of substances from the LC columns recorded as a function of time. Thus for example data sets comprising identifiers such as names representing compounds, and/or substances, and the times and/or ranges of times (including suitable tolerances for variations) at which various ions are released from the LC column (sometimes known as "retention time") are known and can be used in accordance with the invention. An example of an application of this aspect of the invention is an on-demand analysis application for rapid drug screening. In the case where blood or urine sample is provided and requires urgent analysis for a large number of possible toxins or drugs of abuse, this invention provides the user with the ability to simply supply a list of desired analytes. The system can then automatically perform the appropriate mass analyser 100 functions to detect the compounds by obtaining information about scanning parameters, elution times, desired identification ions, etc. from a database.

At 408 controller 54, using data accessed at 404, provides command signals determined at 406 to mass analyzer 100, in order to configure the mass analyzer for analysis of substance(s) provided by ion source 14. In preferred embodiments command signals thus provided cause mass analyzer to be configured accordingly, and are thus used by mass analyzer 100 in performing a desired analysis of the substance(s) and as desired in any subsequent processing of data obtained by the mass analyzer 100.

One of the advantages offered by the invention is improved analysis of multiple compounds and/or the analysis of relatively complex compounds. The invention can be useful, for example, in enabling controller 54 to cause the re-configuration of mass analyzer 100 and/or any components thereof in performing sequential analyses of multiple substances, or in breaking down the analysis of complex compounds into multiple steps, and re-configuring one or more components of mass analyzer 100 for efficient analysis during such analyses or steps, as for example in LC/MS/MS or other recursive spectroscopy. Furthermore, because the invention allows the determination of subsequent analysis based on the data provided by the user in specifying the method, and/or accessed at 404, the system may combine this data with the data collected by the mass analyzer 100 on a per scan basis to correct for deviations in LC performance which may result in compounds of interest eluting at times different from those specified, and/or to adjust the mass analyser 100 duty cycle to improve the signal-to-noise ratio for low intensity peaks, and/or any other appropriate adjustment of the mass analyser 100 parameters which my be indicated by the current or previous scan data. Thus at 410 a determination is made by controller 54 as to whether any subsequent analyses, analysis steps, or mass analyser 100 adjustments are to be performed. If so, process 402-408 is repeated as desired. Thus the invention provides, for example, for increased performance in the execution of multiple scan duty cycles in LC/MS/MS or other recursive analyses.

For example, a recursive mass analyzer such as an LC-MS/MS device 110 can be configured to perform a series of scanning by for example configuring the device to provide suitable electromagnetic fields in devices Q0, Q1, Q2, Q3, and 22 of FIG. 2, and/or suitable pressures in chambers or devices 16,18, 20, 220, 240, at varying points in time, for the optimal detection of ions of varying mass-charge (m/z) ratios as they are released by a chromatographic device. In particular, the mass analyzer may be configured for the detection of ions of varying m/z ratios during the time periods at which they are released by the chromatographic device and made available to the mass analyzer.

An example of the usefulness of this invention in practice is easily found in modern routine analysis. For example, in the analysis of blood or urine samples for drugs of abuse, the analyst is challenged to find a method which can simultaneously detect the presence of hundreds of compounds in the blood or urine sample. In order to facilitate this analysis, LC separation is used to present the mass spectrometer with a liquid stream in which the analytes of interest are generally separated in time throughout the period of the analysis. Because the analytes appear individually for a limited time (peak width) in the LC stream, and because the detector must scan for hundreds of compounds individually in a looped sequence of MRM or other compound specific scan functions, the number of data points available to characterize the presence of a compound in the sample is limited by the number of complete scan cycles which can be accomplished within the typical peak width. For typical triple-quad (QQQ) instrumentation, a scan cycle comprising the individual selective scans for 400 compounds may take up to 20 seconds, depending on the instrument. For typical peak widths of 10-30 seconds, it would be normal to expect only one or two data points per peak. In extreme cases, there is the likelihood that a compound would go undetected as the peak width is smaller than the scan cycle and thus occurs between subsequent scans, thereby eluting undetected. With the implementation of the invention described herein, the user can simply provide the system with a list of compound names and expected elution times or time windows. The system would then automatically, on a scan-by-scan basis, determine which compounds to scan for, thus significantly reducing the number of compounds which are being simultaneously scanned for at any given time during the analysis. Furthermore, the systems has the ability to adjust mass analyser 100 properties on a scan-by-scan basis to perform subsequent MS/MS analysis for compound confirmation, correct for variations in LC performance, and improve signal-to-noise ratios of small signals. This has the effect of increasing the number of data points which represent the eluting analyte peaks, and increasing the instrument duty cycle with respect to each individual analyte. By employing this invention, the data generated by such a multi-compound screening method can be improved by reducing the probability of an undetected peak, improving the quality of peak area determination (quantitation) and allowing for an increase in the speed of analysis. Furthermore, the implementation of large numbers of analytes in a method becomes very simple for the user as all that is required is a list of expected elution times for the desired compounds which the system can interpret in order to appropriately control the detector during the analysis.

As noted above, process 400 illustrated in FIG. 4 and other processes described herein are suitable for implementation using mass analysers such as those shown in FIGS. 1 and 3, and controllers as shown in FIG. 3, executing suitably-programmed algorithms. As will be understood by those of ordinary skill in the relevant arts, such algorithms can be coded or otherwise programmed in a wide variety of ways to provide computer-readable and -executable program codes, including for example through the use of binary language or high-level computer languages such as C++, FORTRAN, C# or any other suitable programming language. The implementation of the code may be approached in several different ways, and the code and information storage necessary may be implemented on either the instrument controller of the host computer.

While the invention has been described and illustrated in connection with preferred embodiments, many variations and modifications, as will be evident to those skilled in the relevant art(s), may be made without departing from the spirit and scope of the invention; and the invention is thus not to be limited to the precise details of methodology or construction set forth above, as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

The section headings used herein are provided for organizational purposes only, and are not to be construed as limiting the subject matter described in any way.

What is claimed is:

1. A method of controlling a mass spectrometer in the analysis of a compound, the method performed by a controller of an automated mass analyzer and comprising:

receiving from an input source signals representing an identifier identifying [a] *the* compound comprising a plurality of substances;

using the identifier, automatically accessing data comprising analysis parameters associated with the identifier and, using the accessed data, automatically determining a set of command signals for use by [a] *the* mass spectrometer in analyzing at least a portion of the compound; and providing the command signal set to the mass spectrometer, in order to configure the mass spectrometer to analyze at least a portion of the compound,

*wherein the method is performed by the controller of the automated mass analyzer comprising a compound source adapted to provide the compound over a period of time,*

*wherein:*

*the method includes the controller receiving a designation identifying a range of times within which portions of the compound are to be provided by the compound source to the mass spectrometer; and*

*the command signal set determined by the controller using the accessed data set and the identified time range is adapted to cause the mass spectrometer to perform multiple scan duty cycles, the respective duty cycles adapted for detecting ions associated with the identifier in accordance with a time at which the ions are to be provided by the compound source.*

[2. The method of claim 1, performed by a controller of an automated mass analyzer comprising a compound source adapted to provide a compound over a period of time, wherein:

the method includes the controller receiving a designation identifying a range of times within which portions of the compound are to be provided by the compound source to the mass spectrometer; and the command signal set determined by the controller using the accessed data set and the identified time range is adapted to cause the mass spectrometer to perform multiple scan duty cycles, the respective duty cycles adapted for detecting ions associated with the identifier in accordance with a time at which the ions are to be provided by the compound source.]

3. The method of claim [2] *1*, wherein the designation identifying a range of times comprises at least one specified time and a time range tolerance.

4. The method of claim [1] *3*, wherein the mass analyzer comprises at least one of a triple quad mass spectrometer, QTrap, and QqTOF device, and the analysis parameters associated with the identifier comprise data useable by the controller for automatically determining command signals adapted for controlling [at least one] *the multiple scan* duty [cycle] *cycles* performed by the mass spectrometer in analyzing the compound.

5. The method of claim 4, wherein the *multiple scan* duty [cycle comprises] *cycles comprise* a portion of a Multiple Reaction Monitoring (MRM) or Enhanced Product Ion (EPI) analysis.

6. A system useful for the automated analysis of compounds using a mass spectrometer, the system comprising:

[a] *the* mass spectrometer adapted to receive ions from ion source, a controller adapted to receive from an input source signals representing an identifier identifying a compound comprising a plurality of substances; to use the identifier to automatically access data comprising analysis parameters associated with the identifier and, using the accessed data, to automatically determine a set of command signals for use by a mass spectrometer in analyzing at least a portion of the compound; and to provide output signals representing the command signal set to the mass spectrometer, for use by the mass spectrometer in analyzing at least a portion of the compound.

7. The system of claim 6, wherein the controller is adapted in accordance with instructions of a control program stored in a memory associated with the controller.

8. The system of claim 7, wherein the memory is volatile or persistent.

9. A computer usable medium having computer readable code embodied therein for causing a controller for a mass analysis system to:

receive from an input source signals representing an identifier identifying a compound comprising a plurality of substances;

using the identifier, automatically access data comprising analysis parameters associated with the identifier and, using the accessed data, automatically determine a set of command signals for use by a mass spectrometer in analyzing at least a portion of the compound; and provide the command signal set to the mass spectrometer, for use by the mass spectrometer in analyzing at least a portion of the compound.

*10. The computer usable medium of claim 9, wherein the computer readable code is further configured to cause the controller to:*

*receive a designation identifying a specified time and a time range tolerance in which portions of the compound are to be provided by a compound source to the mass spectrometer; and*

*cause the mass spectrometer to perform multiple scan duty cycles, wherein respective duty cycles are adapted for detecting ions associated with the identifier in accordance with a time at which the ions are to be provided by the compound source, and wherein the multiple scan duty cycles comprise a portion of a Multiple Reaction Monitoring (MRM) analysis.*

*11. The computer usable medium of claim 10, wherein the computer readable code is configured to cause the controller to receive the designation identifying the specified time and the time range tolerance from at least one of an input device operated by a user and a data store communicatively coupled with the controller.*

*12. The system of claim 6, wherein the controller is further adapted to receive a designation identifying a specified time and a time range tolerance in which portions of the compound are to be provided by a compound source to the mass spectrometer; and cause the mass spectrometer to perform multiple scan duty cycles, wherein respective duty cycles are adapted for detecting ions associated with the identifier in accordance with a time at which the ions are to be provided by the compound source, and wherein the multiple scan duty cycles comprise a portion of a Multiple Reaction Monitoring (MRM) analysis.*

*13. The system of claim 12, wherein the controller is further adapted to receive the designation identifying the specified time and the time range tolerance from at least one of an input device operated by a user and a data store communicatively coupled with the controller.*

*14. The method of claim 3, wherein the designation identifying the specified time and the time range tolerance is received from at least one of an input device operated by a user and a data store communicatively coupled with the controller.*

*15. A method of controlling a mass spectrometer in a Multiple Reaction Monitoring (MRM) analysis of a compound, the method performed by a programmed controller of an automated mass analyzer and comprising:*

*receiving from an input source signals representing an identifier identifying a compound comprising a plurality of substances;*

*receiving at least one designation for each of the plurality of substances, wherein the at least one designation identifies a specified time and a time range tolerance in which each substance would be expected to be received from a LC column associated with the mass spectrometer;*

*using the identifier, automatically accessing data comprising analysis parameters associated with the identifier and, using the accessed data, automatically determining a set of command signals for use by the mass spectrometer in analyzing at least a portion of the compound; and*

*providing the command signal set to the mass spectrometer, in order to configure the mass spectrometer to analyze the portion of the compound by applying one or more voltages to the mass spectrometer such that, at each of a plurality of time points during the MRM analysis, the mass spectrometer is configured to monitor for precursor ions and respective product ions associated with at least one of the plurality of substances when the time point is within the respective time range tolerance identified for the at least one of the plurality of substances.*

*16. The method of claim 15, wherein the at least one designation identifying the specified time and the time range tolerance is received from at least one of an input device operated by a user and a data store communicatively coupled with the programmed controller.*

*17. The method of claim 15, wherein the mass spectrometer comprises at least one of a triple quad mass spectrometer, QTrap, and QqTOF device.*

*18. The method of claim 15, wherein the identifier identifies parent-daughter transitions of interest.*

*19. The method of claim 15, wherein the identifier identifies toxins or drugs of abuse for screening of a biological sample.*

*20. The method of claim 15, wherein the identifier identifies pesticide residues for screening of a food, beverage, or environmental sample.*

*21. The method of claim 15, wherein the plurality of substances analyzed in the compound is greater than 100.*

*22. The method of claim 15, further comprising adjusting the command signal set applied to the mass spectrometer in at least one scan cycle of a plurality of scan cycles based on data generated by the mass spectrometer in an earlier scan cycle to at least one of: i) confirm one or more substances identified in the earlier scan cycle, and ii) correct for variations in elution time from the LC column.*

*23. A system for the automated MRM analysis of compounds, the system comprising:*

*a mass spectrometer adapted to receive ions from an ion source,*

*a controller adapted to:*

*receive from an input source signals representing an identifier identifying a compound comprising a plurality of substances;*

*receive at least one designation for each of the plurality of substances, wherein the at least one designation identifies a specified time and a time range tolerance in which each substance would be expected to be received from a LC column associated with the mass spectrometer;*

*use the identifier to automatically access data comprising analysis parameters associated with the identi-*

*fier and, using the accessed data, automatically determine a set of command signals for use by the mass spectrometer in analyzing at least a portion of the compound; and*

*provide output signals representing the command signal set to the mass spectrometer, for use by the mass spectrometer in analyzing the portion of the compound such that, at each of a plurality of time points during the MRM analysis, the mass spectrometer is configured to monitor for precursor ions and respective product ions associated with at least one of the plurality of substances when the time point is within the respective time range tolerance identified for the at least one of the plurality of substances.*

*24. The system of claim 23, wherein the command signal set controls one or more voltages applied to the mass spectrometer.*

*25. The system of claim 24, wherein the mass spectrometer comprises at least one of a triple quad mass spectrometer, QTrap, and QqTOF device.*

*26. A method of controlling a mass spectrometer in a Multiple Reaction Monitoring (MRM) analysis of a compound, the method performed by a programmed controller of an automated mass analyzer and comprising:*

*receiving from an input source signals representing an identifier identifying the compound comprising a plurality of substances;*

*receiving at least one designation for each of the plurality of substances, wherein the at least one designation identifies a specified time and a time range tolerance in which each substance would be expected to be received from a LC column associated with the mass spectrometer;*

*using the identifier, automatically accessing data comprising analysis parameters associated with the identifier and, using the accessed data, automatically determining a set of command signals for use by the mass spectrometer in analyzing at least a portion of the compound; and*

*providing the command signal set to the mass spectrometer, in order to configure the mass spectrometer to analyze the portion of the compound by applying one or more voltages to the mass spectrometer such that for each of a plurality of scan cycles during the MRM analysis, the mass spectrometer is configured to monitor for precursor ions and respective product ions associated with one or more selected substances of the plurality of substances when the scan cycle occurs within the respective time range tolerance identified for the one or more selected substances.*

*27. The method of claim 26, wherein the at least one designation identifying the specified time and the time range tolerance is received from at least one of an input device operated by a user and a data store communicatively coupled with the programmed controller.*

*28. The method of claim 26, wherein the mass spectrometer comprises at least one of a triple quad mass spectrometer, QTrap, and QqTOF device.*

*29. The method of claim 26, wherein the identifier identifies parent-daughter transitions of interest.*

*30. The method of claim 26, wherein the identifier identifies toxins or drugs of abuse for screening of a biological sample.*

*31. The method of claim 26, wherein the identifier identifies pesticide residues for screening of a food, beverage, or environmental sample.*

*32. The method of claim 26, wherein the plurality of substances analyzed in the compound is greater than 100.*

*33. The method of claim 26, further comprising adjusting the command signal set applied to the mass spectrometer in at least one scan cycle of the plurality of scan cycles based on data generated by the mass spectrometer in an earlier scan cycle to at least one of: i) confirm one or more substances identified in the earlier scan cycle, and ii) correct for variations in elution time from the LC column.*

*34. A system for the automated MRM analysis of compounds, the system comprising:*

*a mass spectrometer adapted to receive ions from an ion source,*

*a controller adapted to:*

*receive from an input source signals representing an identifier identifying a compound comprising a plurality of substances;*

*receive at least one designation for each of the plurality of substances, wherein the at least one designation identifies a specified time and a time range tolerance in which each substance would be expected to be received from a LC column associated with the mass spectrometer;*

*use the identifier to automatically access data comprising analysis parameters associated with the identifier and, using the accessed data, automatically determine a set of command signals for use by the mass spectrometer in analyzing at least a portion of the compound; and*

*provide output signals representing the command signal set to the mass spectrometer, for use by the mass spectrometer in analyzing the portion of the compound such that for each of a plurality of scan cycles during the MRM analysis, the mass spectrometer is configured to monitor for precursor ions and respective product ions associated with one or more selected substances of the plurality of substances when the scan cycle occurs within the respective time range tolerance identified for the one or more selected substances.*

*35. The system of claim 34, wherein the command signal set controls one or more voltages applied to the mass spectrometer.*

*36. The system of claim 35, wherein the mass spectrometer comprises at least one of a triple quad mass spectrometer, QTrap, and QqTOF device.*

*37. A method of controlling a mass spectrometer in a Multiple Reaction Monitoring (MRM) analysis of a compound, the method performed by a programmed controller of an automated mass analyzer and comprising:*

*receiving from an input source signals representing an identifier identifying the compound comprising a plurality of substances;*

*receiving at least one designation for each of the plurality of substances, wherein the at least one designation identifies a specified time and a time range tolerance in which each substance would be expected to be received from a LC column associated with the mass spectrometer;*

*using the identifier, automatically accessing data comprising analysis parameters associated with the identifier and, using the accessed data, automatically determining a set of command signals for use by the mass spectrometer in analyzing at least a portion of the compound; and*

*providing the command signal set to the mass spectrometer, in order to configure the mass spectrometer to*

*analyze the portion of the compound for a plurality of scan cycles by adjusting one or more voltages applied to the mass spectrometer, wherein the command signal set is configured to adjust which individual selective scans are performed in each scan cycle based on the at least one designation identifying the specified time and the time range tolerance in which each substance would be expected to be received from the LC column.*

*38. The method of claim 37, wherein the command signal set is configured to operate the mass spectrometer such that, at each of a plurality of time points during the MRM analysis, an individual selective scan is performed for at least one of the plurality of substances when the time point is within the respective time range tolerance identified for the at least one of the plurality of substances.*

*39. The method of claim 37, wherein the command signal set is configured to operate the mass spectrometer such that for each scan cycle during the MRM analysis, an individual selective scan for one or more selected substances of the plurality of substances is performed when the scan cycle occurs within the respective time range tolerance identified for the one or more selected substances.*

*40. The method of claim 37, wherein the at least one designation identifying the specified time and the time range tolerance is received from at least one of an input device operated by a user and a data store communicatively coupled with the programmed controller.*

*41. The method of claim 37, wherein the mass spectrometer comprises at least one of a triple quad mass spectrometer, QTrap, and QqTOF device.*

*42. The method of claim 37, wherein the identifier identifies parent-daughter transitions of interest.*

*43. The method of claim 37, wherein the identifier identifies toxins or drugs of abuse for screening of a biological sample.*

*44. The method of claim 37, wherein the identifier identifies pesticide residues for screening of a food, beverage, or environmental sample.*

*45. The method of claim 37, wherein the plurality of substances analyzed in the compound is greater than 100.*

*46. The method of claim 37, further comprising adjusting the command signal set applied to the mass spectrometer in at least one scan cycle of the plurality of scan cycles based on data generated by the mass spectrometer in an earlier scan cycle to at least one of: i) confirm one or more substances identified in the earlier scan cycle, and ii) correct for variations in elution time from the LC column.*

*47. A system for the automated MRM analysis of compounds, the system comprising:*

*a mass spectrometer adapted to receive ions from an ion source,*

*a controller adapted to:*

*receive from an input source signals representing an identifier identifying a compound comprising a plurality of substances;*

*receive at least one designation for each of the plurality of substances, wherein the at least one designation identifies a specified time and a time range tolerance in which each substance would be expected to be received from a LC column associated with the mass spectrometer;*

*use the identifier to automatically access data comprising analysis parameters associated with the identifier and, using the accessed data, automatically determine a set of command signals for use by the mass spectrometer in analyzing at least a portion of the compound; and*

*provide output signals representing the command signal set to the mass spectrometer, for use by the mass spectrometer in analyzing the portion of the compound for a plurality of scan cycles, wherein the command signal set is configured to adjust which individual selective scans are performed in each scan cycle based on the at least one designation identifying the specified time and the time range tolerance in which each substance would be expected to be received from the LC column.*

*48. The system of claim 47, wherein the command signal set controls one or more voltages applied to the mass spectrometer.*

*49. The system of claim 48, wherein the mass spectrometer comprises at least one of a triple quad mass spectrometer, QTrap, and QqTOF device.*

*50. A method of controlling a mass spectrometer in a Multiple Reaction Monitoring (MRM) analysis of a compound, the method performed by a programmed controller of an automated mass analyzer and comprising:*

*receiving from an input source signals representing an identifier identifying the compound comprising a plurality of substances;*

*receiving at least one designation for each of the plurality of substances, wherein the at least one designation identifies a specified time and a time range tolerance in which each substance would be expected to be received from a LC column associated with the mass spectrometer;*

*using the identifier, automatically accessing data comprising analysis parameters associated with the identifier and, using the accessed data, automatically determining a set of command signals for use by the mass spectrometer in analyzing at least a portion of the compound; and*

*providing the command signal set to the mass spectrometer, in order to configure the mass spectrometer to analyze the portion of the compound for a plurality of scan cycles by applying one or more voltages to the mass spectrometer, wherein a duty cycle of each scan cycle is based on the at least one designation identifying the specified time and the time range tolerance in which each of the plurality of substances would be expected to be received from the LC column.*

*51. The method of claim 50, wherein the command signal set is configured to operate the mass spectrometer such that, at each of a plurality of time points during the MRM analysis, the mass spectrometer is configured to monitor for precursor ions and respective product ions associated with at least one of the plurality of substances when the time point is within the respective time range tolerance identified for the at least one of the plurality of substances.*

*52. The method of claim 50, wherein the command signal set is configured to operate the mass spectrometer such that for each scan cycle during the MRM analysis, the mass spectrometer is configured to monitor for precursor ions and respective product ions associated with one or more selected substances of the plurality of substances when the scan cycle occurs within the respective time range tolerance identified for the one or more selected substances.*

*53. The method of claim 50, wherein the at least one designation identifying the specified time and the time range tolerance is received from at least one of an input device operated by a user and a data store communicatively coupled with the programmed controller.*

*54. The method of claim 50, wherein the mass spectrometer comprises at least one of a triple quad mass spectrometer, QTrap, and QqTOF device.*

*55. The method of claim 50, wherein the identifier identifies parent-daughter transitions of interest.*

*56. The method of claim 50, wherein the identifier identifies toxins or drugs of abuse for screening of a biological sample.*

*57. The method of claim 50, wherein the identifier identifies pesticide residues for screening of a food, beverage, or environmental sample.*

*58. The method of claim 50, wherein the plurality of substances analyzed in the compound is greater than 100.*

*59. The method of claim 50, further comprising adjusting the command signal set applied to the mass spectrometer in at least one scan cycle of the plurality of scan cycles based on data generated by the mass spectrometer in an earlier scan cycle to at least one of: i) confirm one or more substances identified in the earlier scan cycle, and ii) correct for variations in elution time from the LC column.*

*60. A system for the automated MRM analysis of compounds, the system comprising:*

*a mass spectrometer adapted to receive ions from an ion source,*

*a controller adapted to:*

*receive from an input source signals representing an identifier identifying a compound comprising a plurality of substances;*

*receive at least one designation for each of the plurality of substances, wherein the at least one designation identifies a specified time and a time range tolerance in which each substance would be expected to be received from a LC column associated with the mass spectrometer;*

*use the identifier to automatically access data comprising analysis parameters associated with the identifier and, using the accessed data, automatically determine a set of command signals for use by the mass spectrometer in analyzing at least a portion of the compound; and*

*provide output signals representing the command signal set to the mass spectrometer, for use by the mass spectrometer in analyzing the portion of the compound for a plurality of scan cycles, wherein the command signal set is configured to adjust a duty cycle of each scan cycle based on the at least one designation identifying the specified time and the time range tolerance in which each of the plurality of substances would be expected to be received from the LC column.*

*61. The system of claim 60, wherein the command signal set controls one or more voltages applied to the mass spectrometer.*

*62. The system of claim 61, wherein the mass spectrometer comprises at least one of a triple quad mass spectrometer, QTrap, and QqTOF device.*

*63. A method of controlling a mass spectrometer in a Multiple Reaction Monitoring (MRM) analysis of a compound, the method performed by a programmed controller of an automated mass analyzer and comprising:*

*receiving from an input source signals representing an identifier identifying the compound comprising a plurality of substances;*

*receiving at least one designation for each of the plurality of substances, wherein the at least one designation identifies a specified time and a time range tolerance in which each substance would be expected to be received from a LC column associated with the mass spectrometer;*

*using the identifier, automatically accessing data comprising analysis parameters associated with the identifier and, using the accessed data, automatically determining an optimal duty cycle for each of the plurality of substances based on the at least one designation and a set of command signals for use by the mass spectrometer in analyzing at least a portion of the compound; and*

*providing the command signal set to the mass spectrometer, in order to configure the mass spectrometer to analyze the portion of the compound based on the optimal duty cycles by adjusting one or more voltages applied to the mass spectrometer.*

*64. The method of claim 63, wherein the command signal set is configured to operate the mass spectrometer such that, at each of a plurality of time points during the MRM analysis, the mass spectrometer is configured to monitor for precursor ions and respective product ions associated with at least one of the plurality of substances when the time point is within the respective time range tolerance identified for the at least one of the plurality of substances.*

*65. The method of claim 63, wherein the command signal set is configured to operate the mass spectrometer such that for each scan cycle during the MRM analysis, the mass spectrometer is configured to monitor for precursor ions and respective product ions associated with one or more selected substances of the plurality of substances when the scan cycle occurs within the respective time range tolerance identified for the one or more selected substances.*

*66. The method of claim 63, wherein the at least one designation identifying the specified time and the time range tolerance is received from at least one of an input device operated by a user and a data store communicatively coupled with the programmed controller.*

*67. The method of claim 63, wherein the mass spectrometer comprises at least one of a triple quad mass spectrometer, QTrap, and QqTOF device.*

*68. The method of claim 63, wherein the identifier identifies parent-daughter transitions of interest.*

*69. The method of claim 63, wherein the identifier identifies toxins or drugs of abuse for screening of a biological sample.*

*70. The method of claim 63, wherein the identifier identifies pesticide residues for screening of a food, beverage, or environmental sample.*

*71. The method of claim 63, wherein the plurality of substances analyzed in the compound is greater than 100.*

*72. The method of claim 63, further comprising adjusting the command signal set applied to the mass spectrometer in at least one scan cycle of a plurality of scan cycles based on data generated by the mass spectrometer in an earlier scan cycle to at least one of: i) confirm one or more substances identified in the earlier scan cycle, and ii) correct for variations in elution time from the LC column.*

*73. A system for the automated MRM analysis of compounds, the system comprising:*

*a mass spectrometer adapted to receive ions from an ion source,*

*a controller adapted to:*

*receive from an input source signals representing an identifier identifying a compound comprising a plurality of substances;*

*receive at least one designation for each of the plurality of substances, wherein the at least one designation*

*identifies a specified time and a time range tolerance in which each of the plurality of substances would be expected to be received from a LC column associated with the mass spectrometer;*

*use the identifier to automatically access data comprising analysis parameters associated with the identifier and, using the accessed data, automatically determine an optimal duty cycle for each of the plurality of substances based on the at least one designation and a set of command signals for use by the mass spectrometer in analyzing at least a portion of the compound; and*

*provide output signals representing the command signal set to the mass spectrometer, for use by the mass spectrometer in analyzing the portion of the compound based on the optimal duty cycles.*

*74. The system of claim 73, wherein the command signal set controls one or more voltages applied to the mass spectrometer.*

*75. The system of claim 74, wherein the mass spectrometer comprises at least one of a triple quad mass spectrometer, QTrap, and QqTOF device.*

*76. A method of controlling a mass spectrometer in a Multiple Reaction Monitoring (MRM) analysis of a compound, the method performed by a programmed controller of an automated mass analyzer and comprising:*

*receiving from an input source signals representing an identifier identifying the compound comprising a plurality of substances;*

*receiving at least one designation for each of the plurality of substances, wherein the at least one designation identifies a specified time and a time range tolerance in which each substance would be expected to be received from a LC column associated with the mass spectrometer;*

*using the identifier, automatically accessing data comprising analysis parameters associated with the identifier and, using the accessed data, automatically determining a set of command signals for use by the mass spectrometer in analyzing at least a portion of the compound;*

*providing the command signal set to the mass spectrometer, in order to configure the mass spectrometer to analyze the portion of the compound for a plurality of scan cycles by applying one or more voltages to the mass spectrometer; and*

*adjusting the command signal set applied to the mass spectrometer in at least one scan cycle of the plurality of scan cycles based on data generated by the mass spectrometer in an earlier scan cycle to at least one of: i) confirm one or more substances identified in the earlier scan cycle, and ii) correct for variations in elution time from the LC column.*

*77. The method of claim 76, wherein the command signal set is configured to adjust which individual selective scans are performed in each scan cycle based on the at least one designation identifying the specified time and the time range tolerance in which each of the plurality of substances would be expected to be received from the LC column.*

*78. The method of claim 76, wherein a duty cycle of each scan cycle is based on the at least one designation identifying the specified time and the time range tolerance in which each of the plurality of substances would be expected to be received from the LC column.*

*79. The method of claim 76, further comprising automatically determining an optimal duty cycle for each of the plurality of substances based on the at least one designation, wherein the command signal set is configured to cause the mass spectrometer to analyze the portion of the compound based on the optimal duty cycles.*

*80. The method of claim 76, wherein the command signal set is configured to operate the mass spectrometer such that, at each of a plurality of time points during the MRM analysis, the mass spectrometer is configured to monitor for precursor ions and respective product ions associated with at least one of the plurality of substances when the time point is within the respective time range tolerance identified for the at least one of the plurality of substances.*

*81. The method of claim 76, wherein the command signal set is configured to operate the mass spectrometer such that for each scan cycle during the MRM analysis, the mass spectrometer is configured to monitor for precursor ions and respective product ions associated with one or more selected substances of the plurality of substances when the scan cycle occurs within the respective time range tolerance identified for the one or more selected substances.*

*82. The method of claim 76, wherein the at least one designation identifying the specified time and the time range tolerance is received from at least one of an input device operated by a user and a data store communicatively coupled with the programmed controller.*

*83. The method of claim 76, wherein the mass spectrometer comprises at least one of a triple quad mass spectrometer, QTrap, and QqTOF device.*

*84. The method of claim 76, wherein the identifier identifies parent-daughter transitions of interest.*

*85. The method of claim 76, wherein the identifier identifies toxins or drugs of abuse for screening of a biological sample.*

*86. The method of claim 76, wherein the identifier identifies pesticide residues for screening of a food, beverage, or environmental sample.*

*87. The method of claim 76, wherein the plurality of substances analyzed in the compound is greater than 100.*

*88. A system for the automated MRM analysis of compounds, the system comprising:*

*a mass spectrometer adapted to receive ions from an ion source,*

*a controller adapted to:*

*receive from an input source signals representing an identifier identifying a compound comprising a plurality of substances;*

*receive at least one designation for each of the plurality of substances, wherein the at least one designation identifies a specified time and a time range tolerance in which each of the plurality of substances would be expected to be received from a LC column associated with the mass spectrometer;*

*use the identifier to automatically access data comprising analysis parameters associated with the identifier and, using the accessed data, automatically determine a set of command signals for use by the mass spectrometer in analyzing at least a portion of the compound; and*

*provide output signals representing the command signal set to the mass spectrometer, for use by the mass spectrometer in analyzing the portion of the compound for a plurality of scan cycles, wherein the command signal set is adjusted in at least one scan cycle of the plurality of scan cycles based on data generated by the mass spectrometer in an earlier scan cycle to at least one of: i) confirm one or more*

*substances identified in the earlier scan cycle, and ii) correct for variations in elution time from the LC column.*

*89. The system of claim 88, wherein the command signal set controls one or more voltages applied to the mass spectrometer.*

*90. The system of claim 89, wherein the mass spectrometer comprises at least one of a triple quad mass spectrometer, QTrap, and QqTOF device.*

* * * * *